US011900761B2

(12) United States Patent
Tillery et al.

(10) Patent No.: US 11,900,761 B2
(45) Date of Patent: Feb. 13, 2024

(54) CASH DOOR DESIGN FOR WAGER-BASED GAMING MACHINE CABINETS

(71) Applicant: AGS LLC, Las Vegas, NV (US)

(72) Inventors: James Ely Tillery, Atlanta, GA (US); Kevin Berwick Green, Atlanta, GA (US)

(73) Assignee: AGS LLC, Las Vegas, NV (US)

( * ) Notice: Subject to any disclaimer, the term of this patent is extended or adjusted under 35 U.S.C. 154(b) by 0 days.

(21) Appl. No.: 18/154,708

(22) Filed: Jan. 13, 2023

(65) Prior Publication Data

US 2023/0154275 A1 May 18, 2023

Related U.S. Application Data

(60) Division of application No. 16/946,920, filed on Jul. 10, 2020, now Pat. No. 11,587,392, which is a continuation of application No. 16/130,124, filed on Sep. 13, 2018, now Pat. No. 10,713,885.

(51) Int. Cl.
*G07F 17/32* (2006.01)

(52) U.S. Cl.
CPC ...... *G07F 17/3216* (2013.01); *G07F 17/3209* (2013.01); *G07F 17/3241* (2013.01)

(58) Field of Classification Search
None
See application file for complete search history.

(56) References Cited

U.S. PATENT DOCUMENTS

| | | | | |
|---|---|---|---|---|
| 5,533,605 | A | 7/1996 | Mays et al. | |
| 5,544,595 | A | 8/1996 | Stephenson, III et al. | |
| 5,676,231 | A | 10/1997 | Legras et al. | |
| 10,713,885 | B2 | 7/2020 | Tillery et al. | |
| 11,587,392 | B2 | 2/2023 | Tillery et al. | |
| 2007/0182204 | A1 | 8/2007 | Curtis et al. | |
| 2019/0096171 | A1* | 3/2019 | Patel | E05D 5/06 |
| 2020/0090461 | A1 | 3/2020 | Tillery et al. | |
| 2020/0342709 | A1 | 10/2020 | Tillery et al. | |

OTHER PUBLICATIONS

U.S. Appl. No. 16/130,124, Examiner Initiated Interview Summary dated Apr. 29, 2020.

(Continued)

*Primary Examiner* — Robert T Clarke, Jr.
(74) *Attorney, Agent, or Firm* — Wolf IP Law PLLC; Dean E. Wolf, Esq.

(57) ABSTRACT

An upright gaming machine includes a game determination component that facilitates a wager-based game result, input/output devices coupled to the game determination component, a gaming machine cabinet housing various gaming machine components, and lower and cash access doors located about the gaming machine cabinet. The lower door can be fully removable from the gaming machine, can facilitate access to an internal belly region, and can include a tethered locking arrangement having rotary latches, stationary pins, and a tether. The cash door includes a virtual pivot hinge opening arrangement that moves the cash door in a swivel motion from a closed position to an open position, where the swivel motion of the cash door is about a virtual axis having a center of rotation for which no physical component passes therethrough.

18 Claims, 10 Drawing Sheets

(56) References Cited

OTHER PUBLICATIONS

U.S. Appl. No. 16/130,124, Notice of Allowance dated May 18, 2020. 11 pages.
Notice of Allowance, U.S. Appl. No. 16/946,920, dated Sep. 21, 2022, 8 pages.
Photos of hinged cash box (Konami concerto cabinet photo taken Jul. 30, 2018) 3 pages.

* cited by examiner

CASH DOOR DESIGN FOR WAGER-BASED GAMING MACHINE CABINETS

RELATED APPLICATION DATA

This application is a divisional application, pursuant to the provisions of 35 U.S.C. § 120, of prior U.S. patent application Ser. No. 16/946,920 titled "IMPROVED CASH DOOR DESIGN FOR WAGER-BASED GAMING MACHINE CABINETS" by TILLERY et al., filed 10 Jul. 2020, the entirety of which is incorporated herein by reference for all purposes.

U.S. patent application Ser. No. 16/946,920 is a continuation application, pursuant to the provisions of 35 U.S.C. § 120, of prior U.S. patent application Ser. No. 16/130,124 titled "UPRIGHT GAMING MACHINE LOWER AND CASH DOORS" by TILLERY et al., filed 13 Sep. 2018, the entirety of which is incorporated herein by reference for all purposes.

BACKGROUND

Slot machines and other gaming machines are a very popular form of gaming in casinos, bars, restaurants, stores, and other gaming establishments. Many slot machines and gaming machines have various access doors internally and about the outer gaming cabinet. This can include cash doors, service doors, belly doors, rear cabinet doors, and the like. Such access doors can allow varying levels of access to internal portions of the gaming machine, such as to retrieve coins or cash, service various electronic functions, and repair or update components. Different designs for gaming machines can require certain sizes, shapes, weights, and locking mechanisms for these gaming machine doors. For example, while a standard casino pedestal limits the width of most upright gaming machines to 28 inches, a narrower upright gaming machine cabinet design can be more attractive to casino operators who might desire more machines in the same amount of space. A narrower cabinet design, however, may require access doors that are not cumbersome but are still aesthetically pleasing with good locking integrity. This can result in customized changes to a door relative to existing doors and may even require new features or added components.

Standard access door designs and features can often limit the ability of a gaming machine designer. For example, lower doors that provide access to a belly region of a gaming machine are typically hinged such that they always remain attached to the gaming machine even in an open position. Where a narrower cabinet is desired though, it may be difficult to account for the space needed for standard lower door hinges. As another example, cash doors that provide access to a cash region of a gaming machine typically employ banana pin type hinges such that the door pivots about a physical pin. Such cash doors can be found in U.S. Pat. No. 5,533,605 to Mays, U.S. Pat. No. 5,544,595 to Stephenson, and U.S. Pat. No. 5,676,231 to Legras, for example. This standard cash door design similarly requires consideration for the existence and dimensions of the physical pin. Such considerations for standard access door designs can limit what is possible for designing cabinets and other gaming machine components if narrower cabinets are desired.

Accordingly, there is a need for various access door sizes, shapes, features, and functionalities for gaming machines having newer overall design dimensions. Although traditional access door arrangements for slots and other gaming machines have worked well in the past, improvements for the designs of these access doors are desired.

SUMMARY

Various aspects described or referenced herein are directed to improved cash door designs for wager-based gaming machine cabinets.

One aspect disclosed herein is directed to a gaming machine, comprising: a game determination component that facilitates the result of a wager-based game played at the gaming machine; one or more input devices coupled to the game determination component that accept input from a player regarding the play of the wager-based game; one or more output devices coupled to the game determination component that present output to the player regarding the result of the wager-based game; a gaming machine cabinet configured to house the game determination component, the one or more input devices, and the one or more output devices; a movable cash door located about an external region of the gaming machine cabinet, the cash door facilitating access to a cash region located at an interior of the gaming machine; wherein the cash door is movably attached to the gaming machine via a pivot hinge opening arrangement, the pivot hinge opening arrangement being moveably attached to the gaming machine in a manner which enables movement of the cash door in a swivel motion from a closed position to an open position; and wherein the swivel motion of the cash door is about a virtual axis having a center of rotation for which no physical axial component passes therethrough.

In at least some embodiments, the pivot hinge opening arrangement includes: a first pivot hinge track having a first arc slot located along a first side of the cash door; a second pivot hinge track having a second arc slot located along a second side of the cash door opposite the first side; and wherein the first and second pivot hinge tracks are attached to the cash door in a manner which enables movement of the first and second pivot hinge tracks in the swivel motion about the virtual axis.

In at least some embodiments, the pivot hinge opening arrangement further includes: a first leaf hinge located at the gaming machine housing and configured to mate with the first pivot hinge track, wherein the first leaf hinge includes a first pivot hinge insert configured to extend into the first arc slot; and a second leaf hinge located at the gaming machine housing and configured to mate with the second pivot hinge track, wherein the second leaf hinge includes a second pivot hinge insert configured to extend into the second arc slot.

In at least some embodiments, the pivot hinge opening arrangement further includes: a first hinge pin attached to the first pivot hinge insert; a second hinge pin attached to the second pivot hinge insert; and wherein the first and second hinge pins are attached in a manner which facilitates stability of the first and second pivot hinge tracks and first and second pivot hinge inserts as the cash door swivels between the closed and open positions.

In at least some embodiments each of the first and second fixed leaf hinges, the first and second pivot hinge inserts, and first and second hinge pins do not move independently while the cash door swivels between the closed and open positions. In at least some embodiments, the first and second pivot hinge tracks swivel or move relative to the pivot hinge inserts while the cash door swivels between the closed and open positions.

In at least some embodiments, the pivot hinge opening arrangement is devoid of a hinge pin about which the cash door pivots about the virtual axis.

In at least some embodiments, the cash door remains coupled to the gaming machine when the cash door is in the open position and closed position.

In at least some embodiments, the pivot hinge opening arrangement further includes first and second pivot inserts, the first and second pivot inserts being attached to the gaming machine in a manner which enables the first and second pivot hinge inserts to remain stationary and inside the first and second arc slots as the cash door moves in the swivel motion.

In at least some embodiments, the gaming machine further includes: an indicator switch coupled to an interior region of the gaming machine, wherein the indicator switch provides a signal regarding a closed position of the cash door; an indicator switch activator configured to actuate the indicator switch when the cash door is in the closed position; and a physical feature located on the virtual pivot hinge opening arrangement, wherein the physical feature moves the indicator switch activator when the cash door is in the closed position.

It is an advantage of the present disclosure to provide gaming machines having improved access door features and components such that narrower upright gaming machine cabinets can be used. Standard access door designs for gaming machines tend to limit the ability of designers when it comes to designing gaming machine cabinets and other components. For example, the typical use of hinged lower doors requires consideration for the hinge and its dimensions, as well as the fact that hinged doors are not fully removable from a gaming machine. Also, where banana pin type hinges are used, such as for cash doors, consideration is required for the need of an actual physical pin about which the door pivots. Conversely, the improved gaming machines disclosed herein allow for customized access doors about a newly designed and dimensioned outer cabinet that is narrower than standard upright gaming machine cabinets. This can be accomplished at least in part using a customized readily removable lower door having a tethered locking component, as well as an outer front cash door having a virtual pivot hinge feature.

In various embodiments of the present disclosure, a gaming machine can include a game determination component, one or more input devices, one or more output devices, an external gaming machine cabinet, and one or more customized access doors located about the gaming machine cabinet. The game determination component can be configured to facilitate the result of a wager-based game played at the gaming machine. The one or more input devices can be coupled to the game determination component and can be configured to accept input from a player regarding the play of the wager-based game. The one or more output devices can be coupled to the game determination component and be configured to present output to a player regarding the result of the wager-based game. The gaming machine cabinet can be suitable for being located at a physical gaming establishment, and can be configured to house one, some, or all of the game determination component and the input and output devices. The one or more customized access doors can include a tethered locking arrangement, a virtual hinge opening arrangement, or both.

In various detailed embodiments, a tethered locking arrangement can be used for a gaming machine access door, such as a lower door that provides access to an internal belly region. An access door using such a tethered locking arrangement can be readily fully removable from the gaming machine, unlike a hinged door. The tethered locking arrangement can include rotary latches installed within the upright gaming machine, stationary pins attached to the access door and configured to be locked within the rotary latches when the access door is properly installed onto the gaming machine, and a tether installed within the upright gaming machine and coupled to the rotary latches such that the rotary latches are configured to be unlocked simultaneously when the tether is pulled. This arrangement can be used for a lower door to overcome standard lower door designs that require hinges and that are not fully removable from the gaming machine. Eliminating lower door hinges allows a narrower cabinet design such that more gaming machines fit in the same amount of casino floor space.

In various detailed embodiments, a virtual pivot hinge opening arrangement can be used for a gaming machine access door, such as a cash door that provides access to an internal cash region. The virtual pivot hinge opening arrangement can be configured to move the access door in a swivel motion from a closed position to an open position such that the swivel motion of the cash door is about a virtual axis having a center of rotation for which no physical component passes therethrough. This arrangement can be used for a cash door to overcome standard cash door designs that require a banana pin type hinge with an actual physical pin about which the door swivels. Again, eliminating banana type hinges having actual pins also allows a narrower cabinet design such that more gaming machines fit in the same amount of space on a casino floor.

In further detailed embodiments, a lower door or other access door having a tethered locking arrangement can include a first wired component configured to be electrically coupled to a second wired component located at the gaming machine cabinet. Also, each of the rotary latches can be coupled to a cam track that is configured to guide a respective stationary pin into or out of the rotary latch. Each of the cam tracks can include a detent configured to support a respective stationary pin when the respective stationary pin is located outside a rotary latch. In the case of a lower door, access to pull the tether can be provided by unlocking and moving a button panel located on the gaming machine above the belly region.

In further detailed embodiments, a cash door or other access door having a virtual pivot hinge opening arrangement can include one pivot hinge track having an arc slot located along one side of the of the access door and another pivot hinge track having an arc slot located along another side of the of the access door opposite the first side. These pivot hinge tracks can be attached to the access door and move in a swivel motion with the access door. The virtual pivot hinge opening arrangement can also include pivot inserts attached to the gaming machine such that the pivot hinge inserts remain stationary and inside the arc slots as the access door moves in a swivel motion.

Further detailed embodiments can include an indicator switch coupled to an interior region of the upright gaming machine, where the indicator switch is configured to provide a signal regarding a closed position of an access door, such as an access door having a virtual pivot hinge opening arrangement. An indicator switch activator can be configured to actuate the indicator switch when the access door is in the closed position. A physical feature can located on the virtual pivot hinge opening arrangement such that the physical feature moves the indicator switch activator when the access door is in the closed position. Again, this can be with respect to a cash door.

Other apparatuses, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed inventive systems, apparatuses and features for upright gaming machines having customized lower doors, cash doors, or both. These drawings in no way limit any changes in form and detail that may be made to the disclosure by one skilled in the art without departing from the spirit and scope of the disclosure.

DETAILED DESCRIPTION

Figure 1:
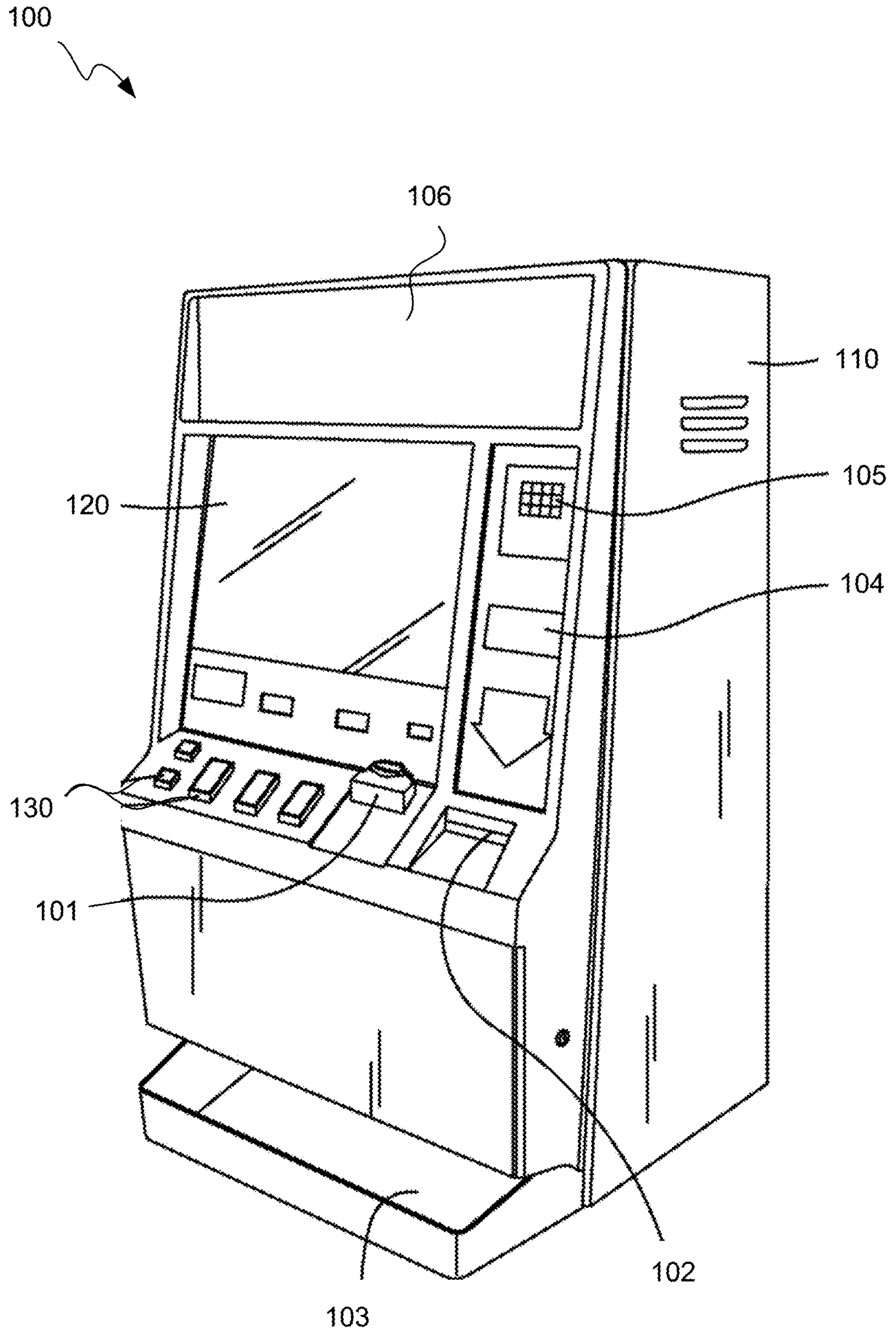
FIG. 1 illustrates in front perspective view a typical gaming machine.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to devices, systems, and methods for providing gaming machines having customized access doors. Such customized access doors can allow for the ready removal or opening of these doors for gaming machines having new or modified cabinet designs, while still retaining an aesthetically pleasing appearance and secure locking features. In particular, the customized access doors disclosed herein allow for a narrower upright gaming machine cabinet that may be more attractive to many casino operators desiring more machines in the same amount of space on a casino floor. The elimination or rearrangement of some components for various access doors can facilitate such a narrower cabinet design. This can be accomplished at least in part for a lower door by eliminating a hinge in favor of a tethered locking component, and for a cash door by eliminating a physical hinge pin in favor of virtual pivot hinge features.

In a typical electronic gaming machine ("EGM"), access doors are common and known components. Such access doors can be located about the outer gaming cabinet, as well as internally after an internal region of the gaming machine has already been accessed. Access doors can include cash doors, service doors, belly doors, rear cabinet doors, and the like. Such access doors can allow varying levels of access to internal portions of the gaming machine, such as to retrieve coins or cash, service various electronic functions, and repair or update components, depending upon the security clearance of casino personnel or other operators. Different designs for gaming machines can require certain sizes, shapes, weights, and locking mechanisms for these access doors, which can result in new features or added components.

Accordingly, the present disclosure provides improved gaming machines having access doors that are specifically designed to accommodate newer or modified external gaming cabinet designs, particularly for a narrower cabinet design for an upright gaming machine. Although the various embodiments disclosed herein involve access doors for an upright gaming machine type, it will be understood that the arrangements, components, and features for the provided examples can also be used on other types of gaming machines.

In various detailed examples, which are merely illustrative and non-limiting in nature, a lower door (which may also be called a "belly door") can have no hinge and can be readily fully removable from the gaming machine, such that access can be had to an internal belly region of the gaming machine without the lower door still being attached. This is in contrast to typical upright gaming machines that have a lower door that is hinged to the external cabinet such that the lower door requires more space to account for the hinge and is typically not readily fully removable from the gaming machine. To allow for such a fully removable nature of the lower door having no hinge, a tethered locking arrangement can be provided using locking rotary latches that are configured to all be actuated by a single tether. Each of the locking rotary latches can lock onto a corresponding stationary pin when the lower door is installed onto the gaming machine. The rotary latches can remain inside the gaming machine when the lower access door is removed, while the corresponding stationary pins can be attached or coupled to the lower door and thereby removed from the gaming machine when the lower door is removed. Detents or other features near where the stationary pins mate with the rotary latches can be provided to facilitate a safe removal of the lower door, so as to help prevent injury during the removal of a door that weighs a significant amount.

To facilitate a relatively easy full removal from the gaming machine, the disclosed lower door can also have a door wired component that removably mates with a machine wired component located on the gaming machine, such as on the gaming machine cabinet. This can allow for the provision of an electrical supply to any electrical components in the lower door, as well as any needed communications between the lower door and the rest of the gaming machine when the lower door is installed. When the lower door is properly installed, the lower door can remain flush with the rest of the external cabinet of the gaming machine, providing an aesthetically pleasing overall appearance. One or more locks may also be provided to keep the lower door locked in place and to prevent or hinder unauthorized access to the internal belly region.

In other detailed examples, which may be separate from or combined with those having the foregoing lower door, an outer cash door located at an external region of the gaming machine can feature a virtual pivot hinge opening arrangement that is configured to move the cash door from in a swivel motion from a closed position to an open position. Unlike the lower door above, the cash door can remain coupled to the external gaming machine cabinet when the cash door is in the open position. The swivel or rotational motion of the cash door can be about a virtual axis having a center of rotation for which no physical component actually passes therethrough. This is in contrast to other cash doors that typically use a "banana hinge" arrangement that involves a physical pin about which the door swivels or rotates, with such door designs also requiring more space. The virtual pivot hinge opening arrangement can includes two pivot hinge tracks having arc slots located along opposite sides of the cash door. The pivot hinge tracks can be attached to the cash door and move in a swivel motion with the cash door when the cash door opens or closes. The virtual pivot hinge opening arrangement can also include pivot inserts attached to the gaming machine, where the pivot hinge inserts remain stationary and inside their respective arc slots as the cash door moves in a swivel motion.

The cash door can also include or be associated with an indicator switch (such as a "cherry switch") coupled to an interior region of the gaming machine at a location that also allows for an overall narrower cabinet, where the indicator switch is configured to provide a signal regarding an open or closed position of the cash door. An indicator switch activator can be configured to actuate the indicator switch when the cash door is in the closed position, and a physical feature can be located on the virtual pivot hinge opening arrangement in order to move the indicator switch activator when the cash door is in the closed position. Again, one or more locks may also be provided to keep the cash door locked in place and to prevent or hinder unauthorized access to the cash region of the gaming machine.

Such gaming machines featuring these customized access doors can allow for maintenance personnel, cash collecting personnel, or other users to access various regions of the gaming machine as may be needed. Furthermore, although the various examples provided herein are made with respect to a lower door and a cash door, it will be readily appreciated that the components and features provided with respect to these access doors can also be used with respect to other types of access doors on gaming machines. Use of the customized access doors disclosed herein allow for a narrower gaming machine cabinet, which in turn allows for more gaming machines to be located in a given space on a casino floor. Other advantages will also become readily apparent upon review of the figures and detailed description set forth below.

Turning first to FIG. 1, a typical gaming machine is illustrated in front perspective view. In various embodiments, methods of game play and presentation can be implemented via a gaming machine or device 100. Such a gaming machine 100 may have various configurations, and again may facilitate the play of wager-based games or other games that are not wager-based. The gaming machine 100 may be located at a casino or other gaming establishment. The gaming machine 100 may be part of a gaming system, such as a casino gaming system which links multiples of the gaming machines, one or more table games, and/or other devices such as kiosks, accounting systems, progressive systems, player tracking systems, respective servers thereof, and the like.

As illustrated, gaming machine 100 generally comprises a physical housing or cabinet 110 for supporting and/or enclosing various components required for operation of the gaming machine. Housing 110 can include a door located at a front thereof, the door capable of being moved between an open position that allows access to the interior, and a closed position where access to the interior is generally prevented. Configurations of the gaming machine 100 may vary. Although gaming machine 100 has an "upright" configuration as shown, alternative configurations, shapes, or dimensions can include a "slant" type, "bar-top" type, "cocktail table" type, and/or other configurations, as are well known to those of skill in the art.

Gaming machine 100 can include various output devices, such as at least one display device 120 located within or proximate the housing or gaming machine cabinet 110 and configured to display game information. The display device 120 may comprise an electronic video display such as a cathode ray tube ("CRT"), high resolution flat panel liquid crystal display ("LCD"), projection LCD, plasma display, field emission display, digital micro-mirror display ("DMD"), digital light processing display ("DLP"), LCD touchscreen, a light emitting display ("LED") or other suitable displays now known or later developed, in a variety of resolutions, sizes and formats (e.g., 4:3, widescreen. or the like). The display device 120 may be capable of projecting or displaying a wide variety of information, including images both still and moving, symbols and other indicia or information associated with game play, game promotion or other events.

In another embodiment, the gaming machine 100 may include one or more physical reels capable of displaying symbols. In such a configuration, means are provided for rotating the physical reels. In some embodiments, a player input to a spin button or a spin arm (a "pull") causes the reels to spin. In some embodiments, electronically controlled mechanisms are arranged to rotate and stop each reel, which mechanisms are well known to those of skill in the art. In such an arrangement, actuation of the spin arm or depression of the spin button can cause a controller (not shown) to signal the activation of the spin mechanism associated with one or more of the reels. The controller can be arranged to either turn off the signal to the device(s) effecting the rotation of each or all of the reels (such as one or more electrically powered stepper motors) or generate a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. Alternatively, the reels can be actuated, controlled, and stopped through purely mechanical means. All such embodiments and details thereof are well known to those of skill in the art.

In various embodiments, gaming machine 100 can be configured to present one or more wager-based games upon a player making a monetary payment or wager. In this regard, gaming machine 100 can include means for accepting monetary value or coin in. In various embodiments, certain game outcomes may be designated as winning outcomes. Prizes or awards may be provided for winning outcomes, such as monetary payments (or representations thereof, such as prize of credits), or promotional awards. The gaming machine 100 can also include mean for returning unused monetary funds and/or dispensing winnings to a player, such as by way of physical coins, printed tickets, cash vouchers, electronically stored credits to player accounts, and the like.

Gaming machine 100 can also include one or more player input devices 130 (such as input buttons, plunger mechanisms, a touch-screen display, joystick, touch-pad, card readers, or the like) that may be located at or proximate the cabinet 110. These one or more input devices 130 may be utilized by the player to facilitate game play, such as by providing input or instruction to the gaming machine 100 per the desires of the player. For example, such input devices 130 may be utilized by a player to place a wager, cause the gaming machine 100 to initiate a game, to indicate cards to be held or discarded, to "cash out" of the gaming machine, or to provide various other inputs that may be necessary or desired.

Gaming machine 100 can include at least one microprocessor-based controller or CPU microprocessor or controller for controlling the gaming machine, including receiving player input and sending output signals for controlling the various components of the machine 100 (such as generating game information for display by the display 120). The controller may be arranged to receive information regarding funds provided by a player to the gaming machine, receive input such as a purchase/bet signal when a purchase/bet button is depressed, and receive other inputs from a player. The controller may be the primary or only game determination component configured to facilitate the result of a wager-based game played at the gaming machine. The controller may also be arranged to generate information regarding a game, such as generating game information for display by the at least one display 120 (such as information representing images of displayed cards), for determining winning or losing game outcomes and for displaying information regarding awards for winning game outcomes, among other things.

The controller or computing microprocessor may be configured to execute machine-readable code or "software" or otherwise process information, such as obtained from a remote server. Software or other instructions may be stored on a memory or data storage device. The memory may also store other information, such as pay table information. The gaming machine 100 may also include one or more random number generators for generating random numbers, such as for use in selecting cards and for presenting the game in a random fashion. This can be part of the game determination of the gaming machine.

The controller can be configured to execute machine-readable code or instructions that are configured to implement game play on the machine. For example, the controller of the gaming machine 100 may be configured to detect a wager, such as a signal from a player depressing of a "bet one" button. Upon such an event and/or the player otherwise signaling the gaming machine to present the game, the controller may be configured to cause slot reels to spin or a graphical representation of spinning slot reels to be displayed on the at least one display 120.

The gaming machine 100 may be configured to generate and present games in a stand-alone manner, or it may be configured to be in communication with one or more external devices at one or more times. For example, the gaming machine 100 may be configured as a server based device such as a "thin-client" terminal, and may obtain game code or game outcome information from a remote game server, in which event the gaming machine controller may receive game information from the server, such as game outcome information, and use that server-generated information to present the game at the gaming machine. Such server system arrangements are generally well known.

The gaming machine 100 can be configured to present one or more wagering games, and may thus be configured to accept value, such as in the form of coins, tokens, paper currency, or other elements or devices representing value such as monetary funds. For example, as illustrated in FIG. 1, the gaming machine 100 might include a coin acceptor 101 for accepting coins. Of course, associated coin reading/verifying devices and coin storage devices may be associated with the gaming machine 100 if it is configured to accept coins. Likewise, the gaming machine 100 might include a media reader 102. Such a reader may be configured to accept and read/verify paper currency and/or other media, such as tickets or cash vouchers. Gaming machine 100 may further be configured with one or more paper currency or ticket storage devices, such as cash boxes, and other paper currency or media handling devices (including transport devices).

The gaming machine 100 might also be configured to read FOBs, magnetic stripe cards or other media having data associated therewith and via which value or funds may be associated with the gaming machine 100. The gaming machine 100 might also be configured to receive information regarding funds associated with a player financial account, such as funds associated with a player casino deposit account or bank account, which account information might be stored elsewhere, such as in association with a casino accounting system.

In one embodiment, the gaming machine 100 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 100 dispensing coins to a coin tray 103. In another embodiment, funds may be issued by dispensing paper currency. In yet another embodiment, a player may be issued a media, such as a printed ticket, which ticket represents the value that was paid or cashed out of the machine. The aspects of gaming machine "ticketing" systems are well known. The gaming machine 100 may also include a player-tracking device, such as a card reader 104 and associated keypad 105. Such player tracking devices are well known and may permit the game operator to track play of players of the gaming machine. The tracked play may be utilized to offer player bonuses or awards.

Gaming machine 100 may also have a secondary display, top glass 106 or the like, which secondary feature may be configured to display a base game, bonus event or other game information. For example, a gaming machine 100 may be configured to display a base game on a main display 120 thereof and may include a top box that has a top glass 106 and/or an associated display (such as a video display and/or physical reels) that is configured to display a bonus event. A casino may have numerous such gaming machines 100, such as located on a casino floor or in other locations. Of course, such gaming machines 100 might be used in other environments, such as an airport, bar, restaurant, store, tavern, or other suitable locations.

It will be appreciated that the gaming machine 100 illustrated in FIG. 1 is only exemplary of one embodiment of a gaming machine. For example, it is possible to for the gaming machine to have various other configurations, including different shapes and styles, and having different components than as just described. For example, it is possible for the game of the invention to be presented on a computing device, including at a home or office computer. In one embodiment, a player might log in to a casino server and the controller of the casino server may cause game information to be delivered to the player's computer and then be displayed on a display of the player's computer. In this regard, it will be noted that the term "controller" may comprise more than one device. For example, in a server-based environment, a controller at a server may generate game information and transmit that information to a local controller at a gaming machine. The local controller at the gaming machine may then cause game information to be displayed on the display of the gaming machine. The games of the invention could also be presented by or at hand-held devices, such as PDAs, cellular phones, tablet computing devices or the like. It is specifically contemplated that the disclosed embodiments may apply to all such alternative types of gaming machines, either directly or through routine extrapolation as will be appreciated by one of skill in the art.

Figure 2:
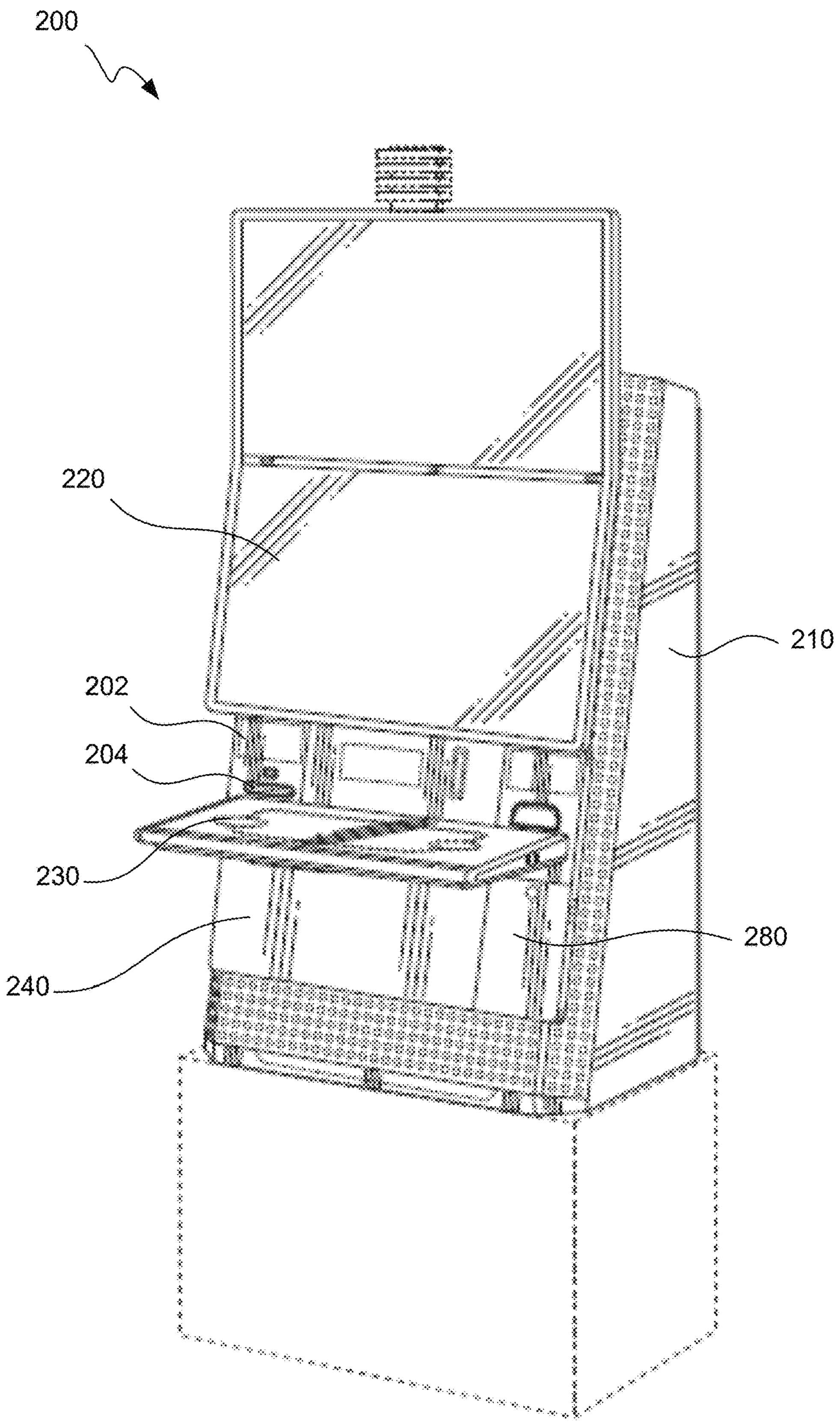
FIG. 2 illustrates in front perspective view an exemplary gaming machine having customized lower and cash doors that are closed according to one embodiment of the present disclosure.

FIG. 2 illustrates in front perspective view a gaming machine having customized lower and cash doors that are closed according to one embodiment of the present disclosure. Gaming machine 200 can be similar in function and appearance with respect to gaming machine 100 of the foregoing example. For example, gaming machine 200 can similarly include a media reader 202, card reader 204, cabinet 210, display device 220, and input devices 230, among other same or similar features.

As in the foregoing example of gaming machine 100, gaming machine 200 can similarly include at least one microprocessor-based controller or CPU microprocessor or controller for controlling the gaming machine 200, including receiving player input and sending output signals for controlling the various components of the gaming machine 200. The controller may be the primary or only game determination component configured to facilitate the result of a wager-based game played at the gaming machine 200. Other details regarding the processor and control of the gaming machine 200 can be the same or substantially similar to the foregoing details for gaming machine 100.

In addition, gaming machine 200 can also include a customized lower door 240 and a customized cash door 280. As shown in FIG. 2, both the lower door 240 and cash door 280 are installed onto the housing or outer gaming machine cabinet 210 and are flush with the cabinet when in closed positions. This provides the appearance of continuity between the doors 240, 280 and the cabinet 210, for an overall aesthetically pleasing appearance. It will be understood that the use of customized lower door 240 and customized cash door 280 allows for an overall design of cabinet 210 that is narrower than standard upright gaming machine cabinets.

Figure 3:
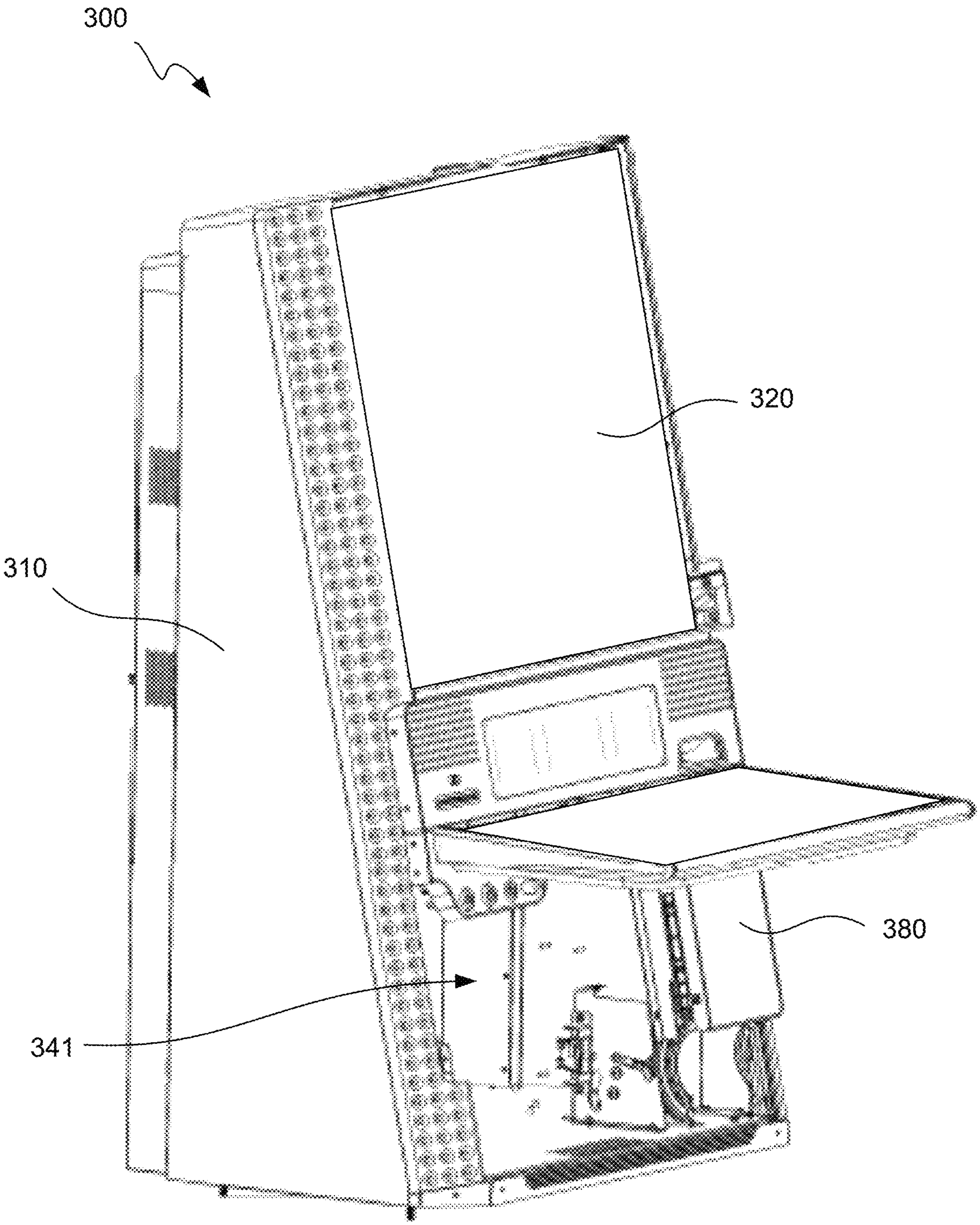
FIG. 3 illustrates in front perspective an exemplary gaming machine with the customized lower door removed and the customized cash door closed according to one embodiment of the present disclosure.

Continuing with FIG. 3, an exemplary gaming machine with its customized lower door removed and its customized cash door closed is illustrated in front perspective view. Gaming machine 300, which can be the same or substantially similar to gaming machine 200 above, can also include a cabinet 310, a display device 320, a controller that functions as a game determination component, and other similar gaming machine features. As shown, a customized lower door for use with gaming machine 300 has been removed from its respective location at a belly portion of the cabinet 310, thereby exposing the internal belly region 341 of the gaming machine. The customized lower door can be fully removable from the gaming machine and can involve a tethered locking arrangement configured to couple the lower door to the gaming machine, rather than a hinge as typically used for lower doors on upright gaming machines. Details regarding such a tethered locking arrangement and other features of the customized lower door and the installation thereof are provided below referencing FIGS. 4A-6B. A customized cash door 380 remains in a closed position as shown in gaming machine 300. The customized cash door 380 can involve a virtual pivot hinge opening arrangement configured to provide access to a cash region of the gaming machine, rather than a banana hinge arrangement having a physical pin. Details regarding such a virtual pivot hinge opening arrangement and other features of the customized cash door and the installation thereof are provided below referencing FIGS. 7-9B.

In general, FIGS. 2 and 3 both provide illustrative examples of upright gaming machines (e.g., 200, 300) having a game determination component configured to facilitate the result of a wager-based game, various input devices (e.g., 230) coupled to the game determination component and configured to accept input from a player regarding the play of the wager-based game, various output devices coupled to the game determination component and configured to present output to the player regarding the result of the wager-based game (e.g., 220), a gaming machine cabinet suitable for the upright gaming machine being located at a physical gaming establishment (e.g., 210). Of course, the gaming machine cabinet can be configured to house the game determination component, input devices, and output devices.

In addition to these general features, FIGS. 2 and 3 also provide illustrative examples of upright gaming machines having customized access doors. A first such access door (e.g., lower door) can be located about the gaming machine cabinet and configured to facilitate access to a first internal region (e.g., belly region) of the upright gaming machine. Such an access door can be readily fully removable from the gaming machine cabinet, and can involve a tethered locking arrangement configured to couple the access door to the gaming machine. A second such access door (e.g., cash door) can be located about the gaming machine cabinet and configured to facilitate access to a second internal region (e.g., cash region) of the upright gaming machine. Such an access door can involve a virtual pivot hinge opening arrangement. Again, the use of these customized access doors allows for a gaming machine cabinet having smaller (e.g., narrower) dimensions.

Lower Door

Figure 4A:
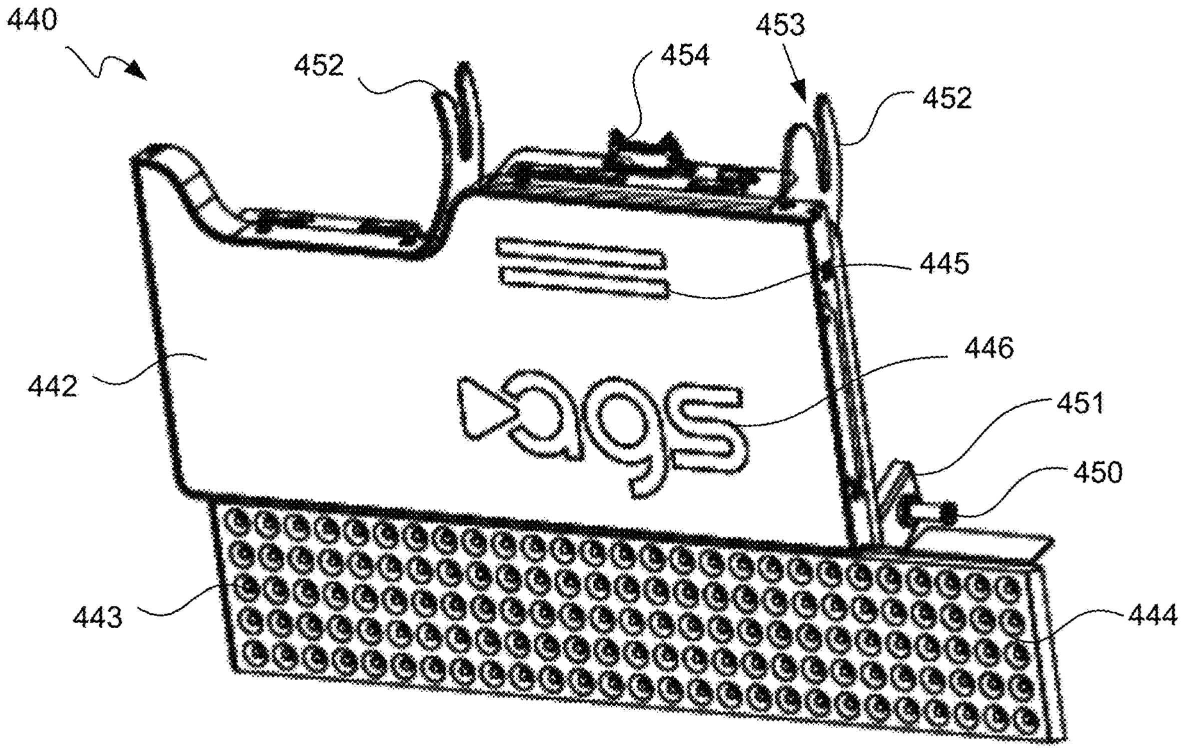
FIG. 4A illustrates in front perspective view an exemplary customized lower door for a gaming machine according to one embodiment of the present disclosure.

Focusing first on the lower door, FIG. 4A illustrates in front perspective view an exemplary customized lower door for a gaming machine according to one embodiment of the present disclosure. Lower door 440 can include an upper portion 442 and a lower portion 443, which lower portion may be attached to or integrated with the upper portion. Lower door 440 can include various decorative features, such as a light array 444 across lower portion 442, aesthetically pleasing vents 445, and a company logo 446, among other possible decorative features. These various decorative features, as well as the size, shape, and general design of lower door 440 can vary as may be desired. Beyond any decorative features or designs, lower door 440 is notable for being readily fully removable from its respective gaming machine and having no hinge, such that a narrower gaming machine cabinet is possible.

As is generally well known, lower doors for gaming machines are typically hinged, with such hinged arrangements not allowing a readily full removal of the lower door from the rest of the gaming machine. In contrast, lower door 440 is not installed into its gaming machine by way of a hinge. Rather, a tethered locking arrangement is used to hold the lower door in place when closed and to facilitate its full removal from the gaming machine when access to the internal belly region is desired. In some arrangements, lower door 440 can weigh about 20 pounds or more. Accordingly, several components and features are included in the tethered locking arrangement to facilitate a relatively safe lifting and removal of the lower door 440 to reduce the risk of operator injury, as set forth below.

Various components and features are provided on lower door 440 and corresponding portions of the gaming machine to facilitate the use of a tethered locking arrangement. A pair of stationary pins 450 (also called "striker pins") can be coupled to the backside of lower door 440 in order to lock within rotary latches inside the gaming machine when the lower door is installed and locked in place. As shown, only one stationary pin 450 is visible in FIG. 4A, with the second stationary pin being located on the opposite side but obscured in this view. Stationary pins 450 can be attached to and extend laterally from pin brackets 451, which pin brackets in turn are attached to and extend backwards from the backside of lower portion 443 of the lower door 440. Further details regarding the locking interaction with the rotary latches located inside the gaming machine are set forth below with respect to FIGS. 5A and 5B. Although two striker pins or stationary pins are used in the illustrated embodiment, it will be readily appreciated that more stationary pins can be used to lock lower door 440 in place on the gaming machine. Alternatively, one stationary pin might be used in other arrangements.

Cam tracks 452 are coupled to and extend upward from the top side of lower door 440, and these cam tracks are used to help hold the lower door firmly in place by straddling a stationary crossbeam within the gaming machine when lower door 452 is installed into the gaming machine. Cam tracks 452 can include an open slot 453 therein to allow for the straddling and easy disengagement from the crossbeam in the gaming machine. As can be seen from the geometry of cam tracks 452 having open slots 453, the lower door 440 can be shifted up and down and also rotated with respect to the stationary crossbeam while still straddling the crossbeam inside the gaming machine. This can allow for the rotating and lifting of the lower door 440 after the stationary pins 450 have been unlocked from the rotary latches.

Wired component 454 can be located at the top of lower door 440, among other locations. Wired component 454 can include a set of wired pin connections that can be readily coupled and uncoupled from a mating wired component located on the gaming machine. This can allow for the provision of an electrical supply and communication links from the gaming machine to various components or devices located on the lower door. For example, the lights in light array 444 can all be wired through the wired component 454 to the mating wired component on the gaming machine, such that the gaming machine can supply power and communications to the light array 444, among other possible electrical or electronic components located on the lower door 440.

Figure 4B:
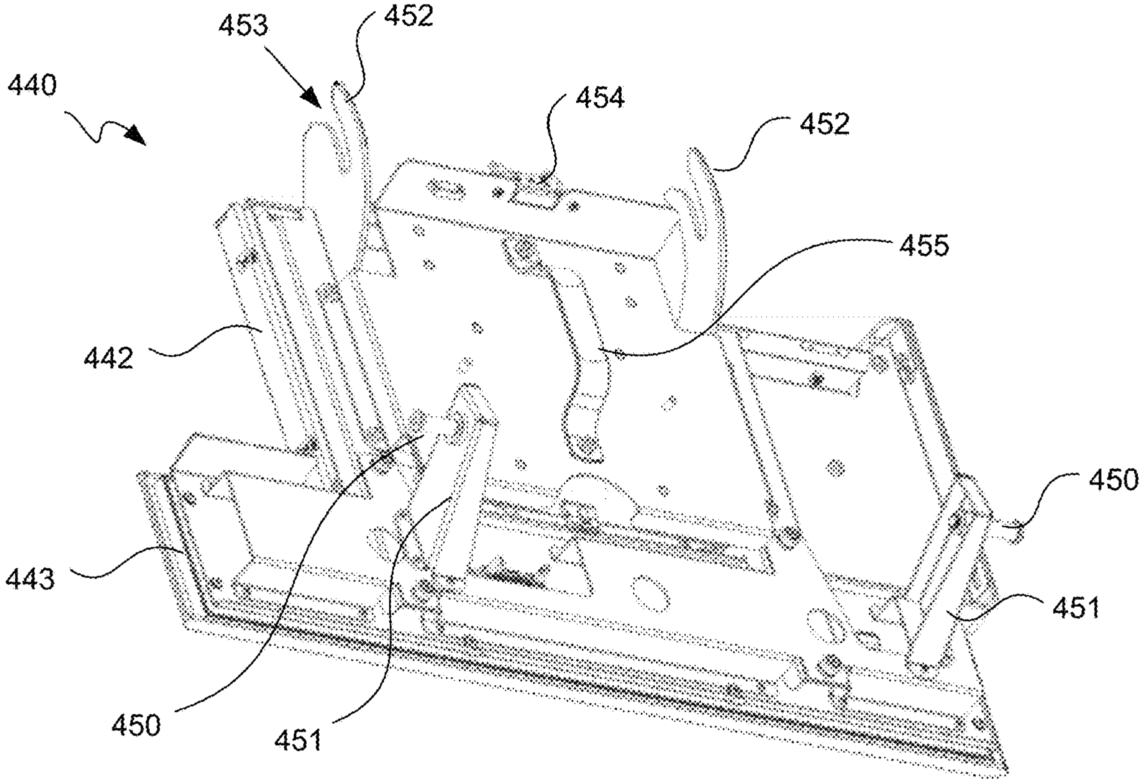
FIG. 4B illustrates in rear perspective view the exemplary customized lower door of FIG. 4A according to one embodiment of the present disclosure.

FIG. 4B illustrates in rear perspective view the exemplary customized lower door of FIG. 4A. Again, lower door 440 can include an upper portion 442, a lower portion 443, two stationary pins 450 coupled to pin brackets 451, cam tracks 452 having open slots 453, and a wired component 454. In addition, a handle 455 can be located on the backside of lower door 440 in order to facilitate the ready installation and full removal of the door to and from the gaming machine.

Figure 5A:
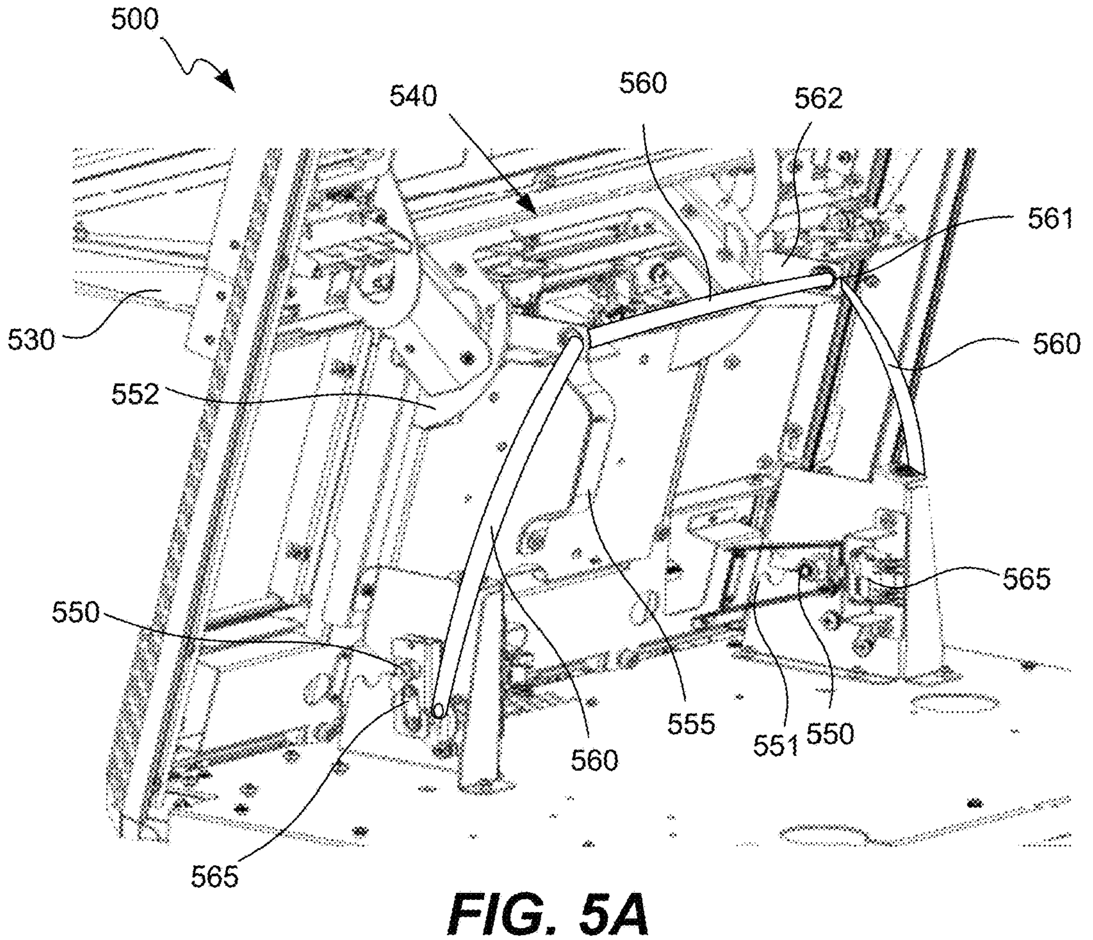
FIG. 5A illustrates in rear perspective cut-away view an exemplary customized lower door installed within a respective gaming machine according to one embodiment of the present disclosure.

Moving next to FIG. 5A, an exemplary customized lower door installed within a respective gaming machine is shown in rear perspective cut-away view. As shown, lower door 540 is installed within an overall upright gaming machine 500. Gaming machine 500 can be the same or substantially similar to either of the gaming machines 200 and 300 described above, while lower door 540 can be the same or substantially similar to lower door 440 described above. Various components of lower door 540 can include stationary pins 550 coupled to pin brackets 551, cam tracks 552 having open slots 553, a wired component 554, and a handle 555, as described in the foregoing embodiment.

In the illustrative embodiment of FIG. 5A, a button panel 530 can be tilted upward from its normal position to enable physical access inside the gaming machine 500 above the lower door 540. This arrangement can allow an operator or user to unlock an access region proximate the button panel 530, tilt upward or otherwise move the button panel, and reach in through an opening above the button panel to grasp a tether 560 that is coupled to two rotary latches 565. The ability to move the button panel 530 from its regular position to create an access opening may be subject to a locking mechanism (not shown) so as to prevent unauthorized access to the tether 560, the pulling of which serves to unlock the lower door 540 for removal. In the illustrated embodiment, the tether 560 and rotary latches 565 can remain inside the gaming machine whether lower door 540 is installed or removed. In the illustrated arrangement, pulling upward on tether 560 actuates both rotary latches 565 simultaneously, such that the stationary pins 550 locked inside the rotary latches 565 are unlocked and can be removed. As shown, tether 560 can be stretched from one rotary latch 565 through grommets 561 located on two tether support posts 562, and to the other rotary latch. This design of the tether 560 and associated components can make it relatively easy for a user to grab the tether 560 between the tether support posts 562 and pull upward, thus unlocking the rotary latches 565.

Figure 5B:
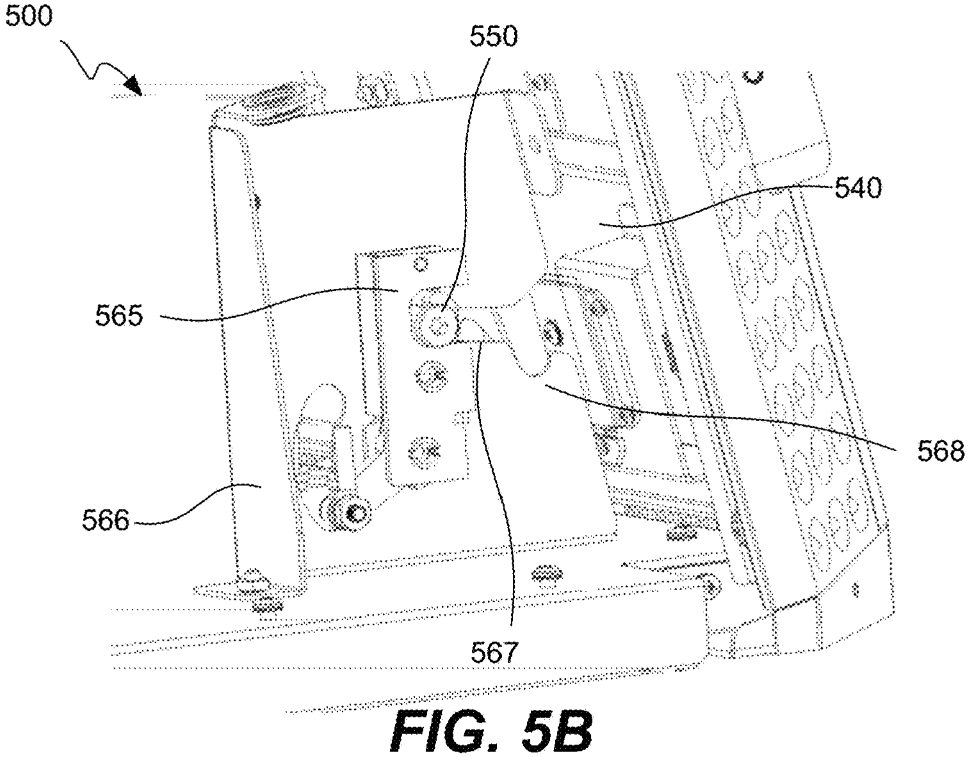
FIG. 5B illustrates in side perspective view the exemplary customized lower door of FIG. 5A installed within a respective gaming machine according to one embodiment of the present disclosure.

Continuing with FIG. 5B the exemplary customized lower door of FIG. 5A installed within a respective gaming machine is shown in side perspective view. In this illustration, lower door 540 is shown as being installed within the gaming machine 500, since stationary pin 550 is set into a locked position inside of rotary latch 565. As noted above, the two stationary pins 550 can be attached or otherwise coupled to opposite sides of lower door 540. As such, the stationary pins 550 are removed with the lower door 540 when the door is removed from the gaming machine. Conversely, the two rotary latches 565 that mate with and lock in the stationary pins 550 remain in place in the gaming machine when the lower door 540 is removed. Each rotary latch 565 can accept a respective stationary pin 550 as the lower door is installed into the gaming machine. The locking mechanism for rotary latch 565 can operate such that a stationary pin 550 can be pushed into the rotary latch, whereupon the rotary latch accepts the stationary pin therein and locks the stationary pin in place. Once the stationary pin 550 is locked in place, it can only be released or removed by actuating the rotary latch 565. Again, this occurs by way of pulling the tether, as noted above. Preferably, pulling on the tether actuates and unlocks both rotary latches 565 simultaneously.

Rotary latches 565 can be mounted in place within the gaming machine on latch brackets 566. Each latch bracket 566 can have a cam track 567 that is configured to guide the stationary pin 550 into or out of the rotary latch 565. The cam track 567 can assist the user or operator in guiding the lower door 540 properly during installation by way of the stationary pins 550 attached to the lower door. Each cam track 567 can also have a notch or detent 568 at a lower portion thereof. Such a detent 568 can aid an operator or other user in removing or installing the lower door 540. That is, cam tracks 567 include detents 568 configured to support a respective stationary pin when the respective stationary pin is located outside of its respective rotary latch 565. Since the lower door 540 may have a substantial weight and be a possible safety concern, it can be safer and easier to ease the weight of the lower door 540 during removal or installation by way of resting the stationary pins 550 within the detents 568 as part of the process of moving the lower door. For example, a user or operator may rest the stationary pins 550 within the detents 568 while grabbing or releasing the handle on the backside of the lower door.

Figure 6:
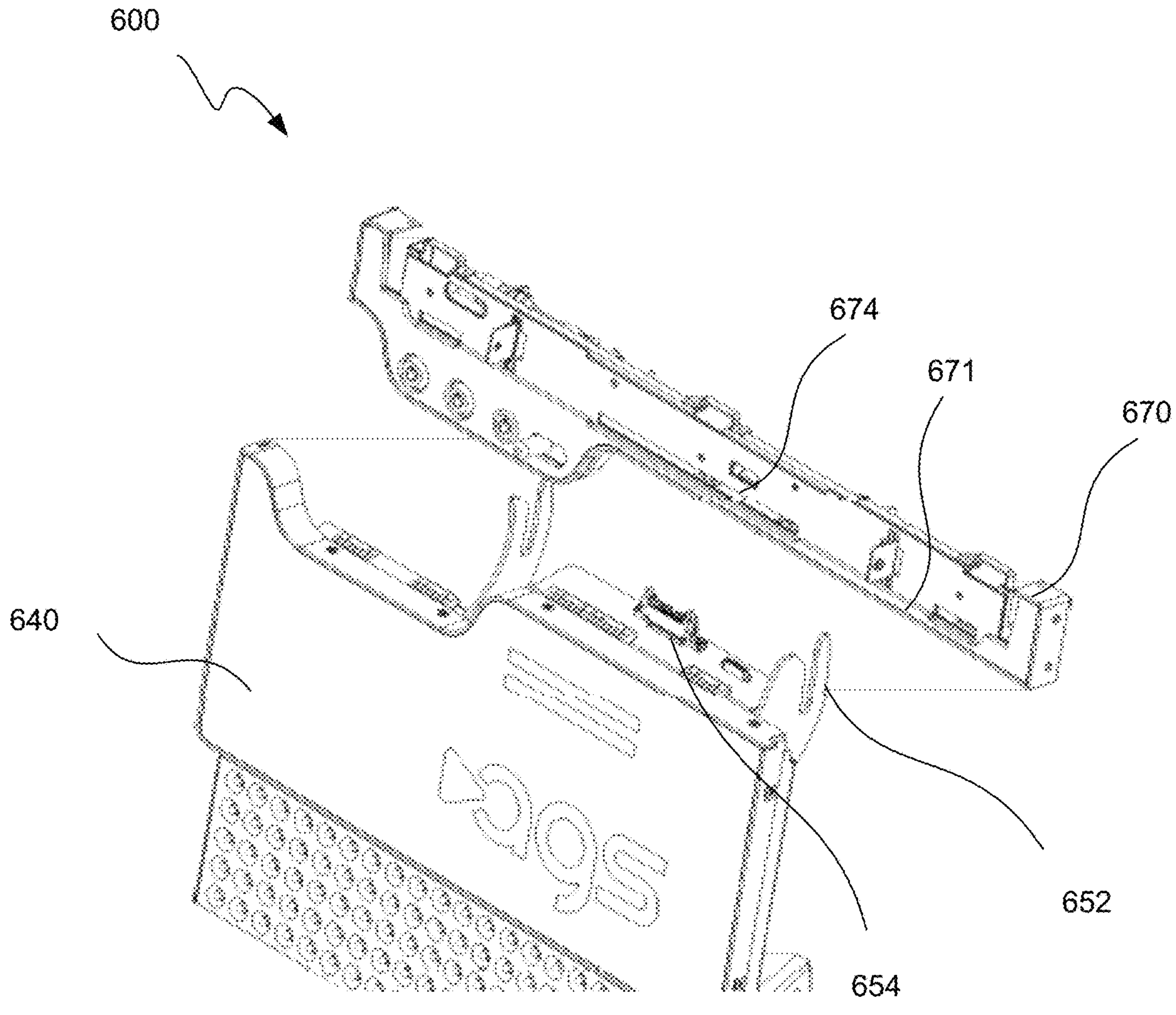
FIG. 6 illustrates in top perspective view exemplary mating arrangements and electrical connectors for the ready removal of a customized lower door of a gaming machine according to one embodiment of the present disclosure.

FIG. 6 illustrates in top perspective view exemplary mating arrangements and electrical connectors for the ready removal of a customized lower door of a gaming machine. Gaming machine 600, which can be the same or substantially similar to the foregoing embodiments, can have a removable lower door 640 that can be installed to and completely removed from the gaming machine. In addition to the stationary pins, rotary latches, tether, and other features detailed above with respect to the lower portions of lower door 640, such as cam track 652, there can also be mating arrangements and electrical connectors at the top portions of the lower door. Lower door wired component 654 can correspond to wired component 454 in the foregoing examples. This lower door wired component 654 can contain electrical connectors in a harness or other set coupling format, such that the lower door wired component can readily mate with a corresponding gaming machine wired component 674 located on the gaming machine. The coupling between wired components 654 and 674 can be readily insertable and removed, so as to facilitate the ready installation and removal of the lower door 640 from the gaming machine 600.

In addition, various mechanical mating arrangements between the lower door 640 and gaming machine 600 can also exist at the top portions of the lower door. As noted above cam tracks 652 can be configured to straddle a stationary bar or crossbeam located inside the gaming machine 600. A lock bar crossbeam chassis 670 can be mounted inside the gaming machine and provide support by way of a lock bar crossbeam 671. The design of the slots on cam tracks 652 on the upper portion of the lower door 640 allows for the lower door to pivot about and shift up and down with respect to the lock bar crossbeam 671. The arrangement of the cam tracks 652 and lock bar crossbeam 671 prevents the lower door 640 from being removed from the gaming machine 640 unless the bottom portion of the door is rotated outward. As noted above, the bottom portion of the door cannot be rotated outward while the stationary pins are locked inside the rotary latches. Thus, access to the tether is required to unlock and remove the lower door 640 from the gaming machine. Other mechanical features may also or alternatively be used to facilitate the secure placement and locking of the lower door 640 within the gaming machine 600 when it is installed. Again, the use of a customized lower door 640 having no hinge allows for a narrower cabinet design compared to typical upright gaming machine cabinet designs.

Cash Door

Figure 7:
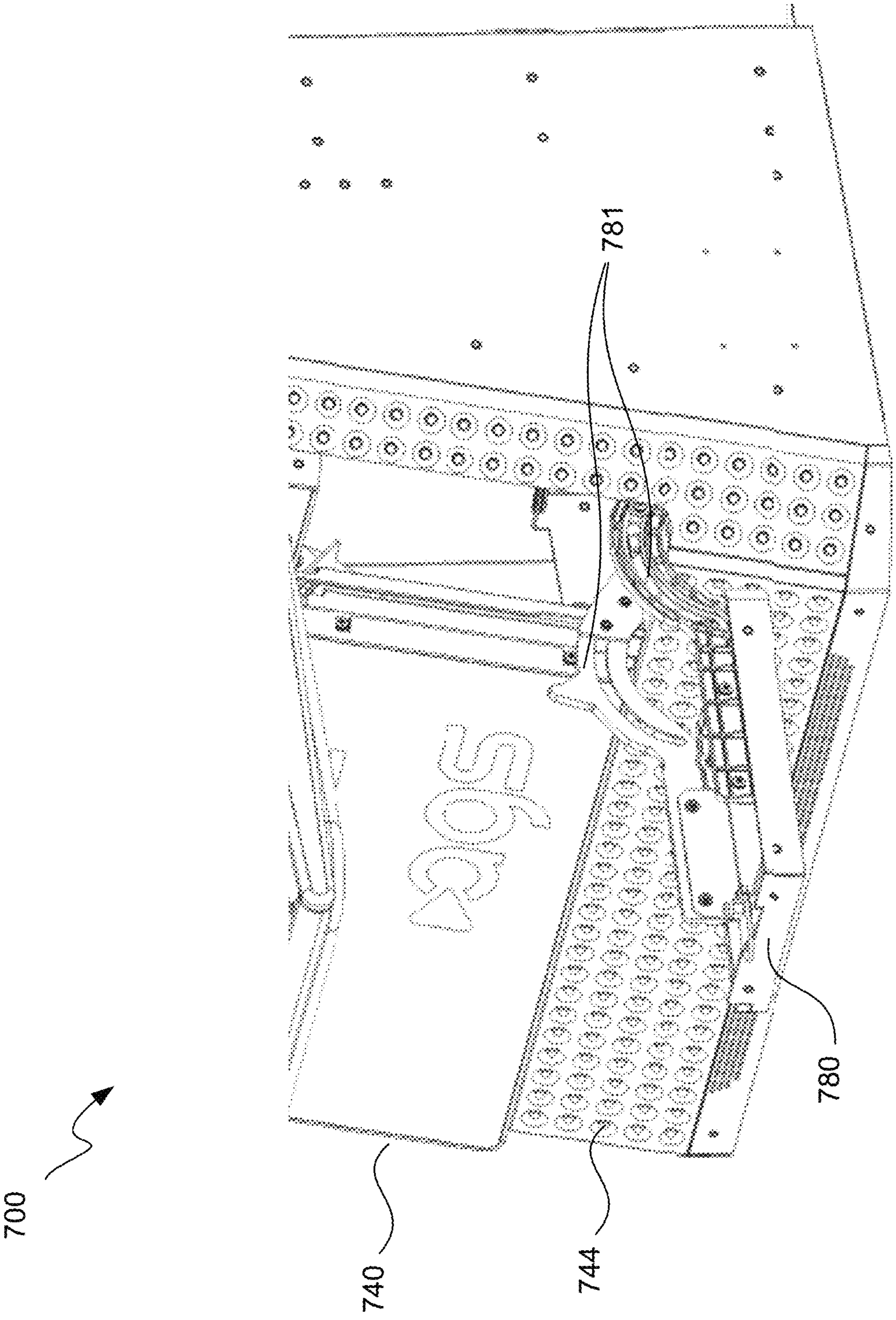
FIG. 7 illustrates in front perspective view an exemplary customized cash door for a gaming machine in an open position according to one embodiment of the present disclosure.

Transitioning now to the cash door, FIG. 7 illustrates in front perspective view an exemplary customized cash door for a gaming machine in an open position according to one embodiment of the present disclosure. Gaming machine 700 can be the same or substantially similar to the gaming machines described in the foregoing embodiments and can include a removable lower door 740 having various features, such as a light array 744. A cash door 780 can be located adjacent to the lower door 740, but unlike the lower door, the cash door is not removable from the gaming machine 700. Rather, cash door 780 rotates or swivels open and closed using a virtual pivot hinge opening arrangement. In particular, the swivel motion of the cash door 740 is about a virtual axis having a center of rotation for which no physical component passes therethrough. This can be accomplished using various specialized components and features, including pivot hinge tracks 781 having arc slots located along the sides of the cash door 740. The elimination of a hinge pin about which the cash door pivots also allows for a narrower cabinet design.

Figure 8:
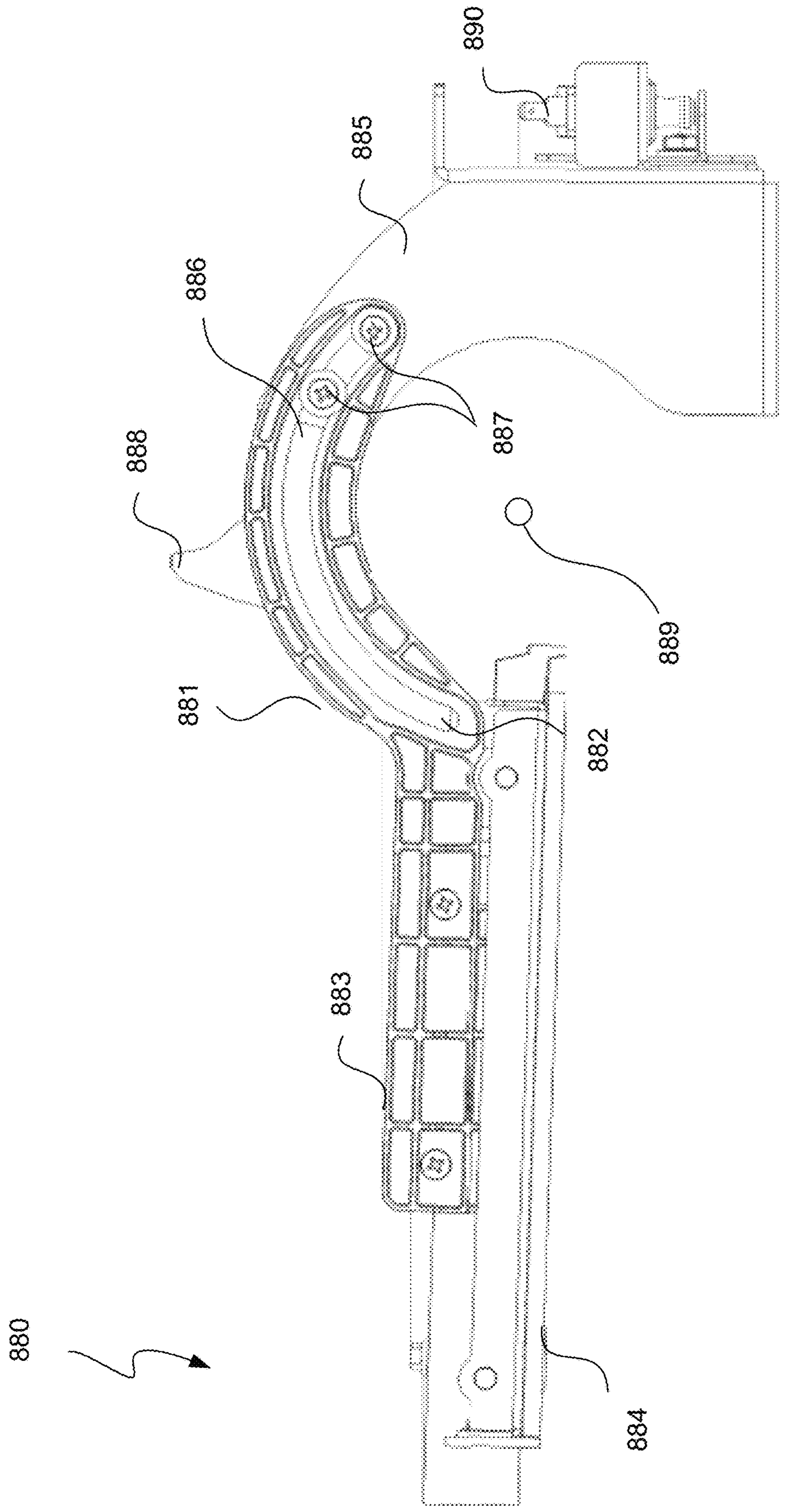
FIG. 8 illustrates in side elevation view the exemplary customized cash door of FIG. 7 in an open position according to one embodiment of the present disclosure.

Continuing with FIG. 8, the exemplary customized cash door of FIG. 7 in an open position is shown in side elevation view. Again, cash door 880 can feature a virtual pivot hinge opening arrangement configured to move the cash door in a swivel motion from a closed position to an open position. Because it is hinged, cash door 880 remains coupled to the gaming machine even when the cash door is in the open position. Unlike banana pin type hinges, however, the swivel motion of cash door 880 is about a virtual axis 889 having a center of rotation for which no physical component passes therethrough.

Cash door 880 includes pivot hinge tracks 881 located on each side of the cash door. Each pivot hinge track 881 includes an arc slot 882 located therein, with the arc slot being adapted to receive a pivot hinge insert 886 or other mating component extending from the gaming machine. The pivot hinge tracks 881 can be integrally formed with or coupled to a coupling component 883 that attaches or couples to the backside of the cash door 880. Cash door 880 also has a front side 884 that is visible outside the gaming machine when the cash door is closed, as will be readily appreciated.

A fixed leaf hinge 885 can be located at the gaming machine housing and can be configured to mate with the pivot hinge tracks 881 of the cash door 880. The fixed leaf hinges 885 can include pivot hinge inserts 886 that extend into the arc slots 882 of the pivot hinge tracks 881. Hinge pins 887 attached to the pivot hinge inserts 886 help facilitate the stability of the pivot hinge tracks 881 and pivot hinge inserts 886 as the cash door 880 swivels between closed and open positions. It will be appreciated that the fixed leaf hinge 885, pivot hinge inserts 886, and hinge pins 887 do not move while the cash door opens or closes. Rather, it is the pivot hinge tracks 881 that swivel or move relative to the pivot hinge inserts 886, which remain stationary. Because no pin, bar, or other physical component is located at the virtual axis 889 about which the cash door 880 swivels or pivots, various new features and alternatives can be included in the design of the gaming machine housing and other gaming machine components.

A physical protrusion or fin 888 can be located on one of the pivot hinge tracks 881. This fin 888 can be integrally formed with or coupled to its pivot hinge track 881 such that the fin moves with its pivot hinge track when the cash door 880 opens or closes. Fin 888 can function to operate with an indicator switch 890 associated with the cash door 880. The indicator switch can be located at the back side of the fixed leaf hinges 885 as shown, although other locations are also possible.

Figure 9A:
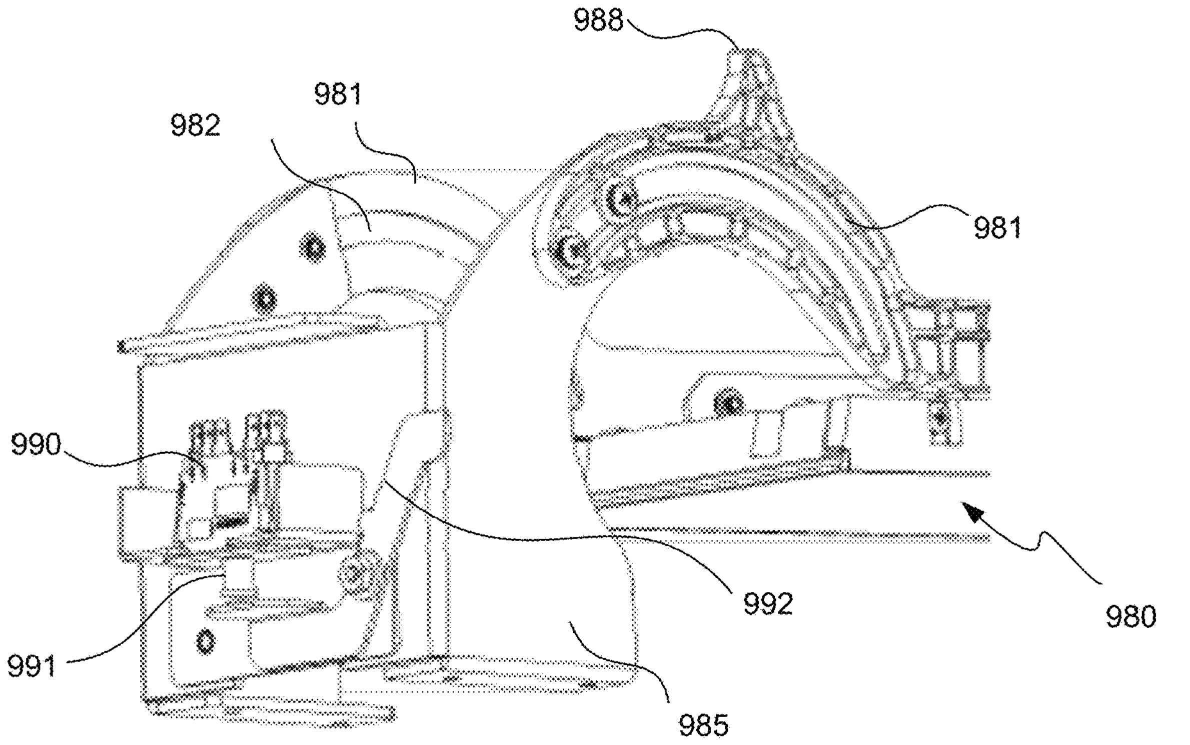
FIG. 9A illustrates in rear perspective view an exemplary indicator switch arrangement for the customized cash door of FIG. 7 while the cash door is in an open position according to one embodiment of the present disclosure.

FIG. 9A illustrates in rear perspective view an exemplary indicator switch arrangement for the customized cash door of FIG. 7 while the cash door is in an open position according to one embodiment of the present disclosure. Again, cash door 980 can feature a virtual pivot hinge opening arrangement configured to move the cash door in a swivel motion, wherein the pivot hinge tracks 981 are the components that actually move with the cash door 980. Both pivot hinge tracks 981 include arc slots 982 therein so as to accept the stationary pivot hinge inserts located on the gaming machine. An indicator switch 990 located at the back of the fixed leaf hinges 985 can be configured to indicate whether the cash door 980 is open or closed. For example, a button 991 on the indicator switch 990 can be actuated when the cash door is closed. The status of the cash door as open or closed can be provided by a light located elsewhere on the gaming machine or some other location, as well as an electronic alert or alarm as may be desired. It will be appreciated that the location of the indicator switch 990 at the back of the fixed leaf hinges 985 also allows for a narrower design of the gaming machine cabinet.

As shown in FIG. 9A cash door 980 is in an open position. As such, the button 991 on the indicator switch 990 is not actuated. Actuation of the button 991 takes place when an indicator switch activator 982 is moved to contact the button. A fin 988 located on one of the pivot hinge tracks 981 moves with its pivot hinge track to contact the indicator switch activator 992, which in turn contacts and actuates the button 991. Because the cash door 980 is open in FIG. 9A, no actuation is made from the fin 988 to the indicator switch activator 992 to the button 991.

Figure 9B:
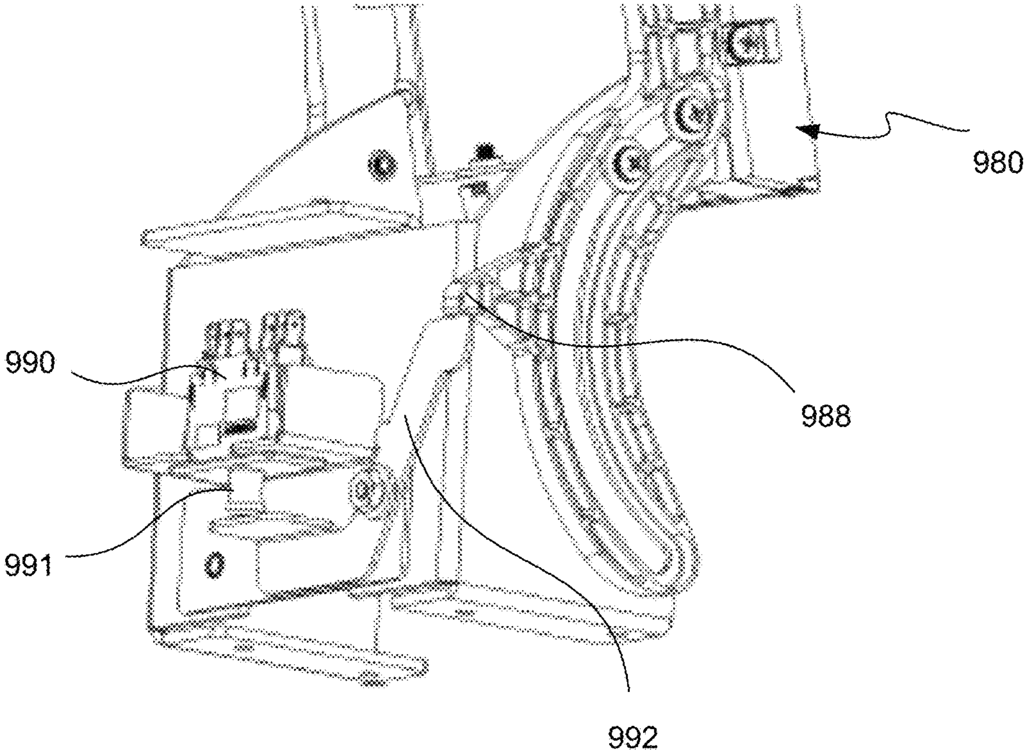
FIG. 9B illustrates in rear perspective view an exemplary indicator switch arrangement for the customized cash door of FIG. 7 while the cash door is in a closed position according to one embodiment of the present disclosure.

Conversely, FIG. 9B illustrates in rear perspective view an exemplary indicator switch arrangement for the customized cash door of FIG. 7 while the cash door is in a closed position. As shown here, closing the cash door 980 results in the fin 988 contacting and pushing the indicator switch activator 992, which in turn contacts and actuates the button 991 on the indicator switch. As will be readily appreciated, a simple mechanical bias such as a spring bias (not shown) on the indicator switch activator 992 can prevent an unwanted actuation of the button 991 when the cash door is in the open position.

Figure 10:
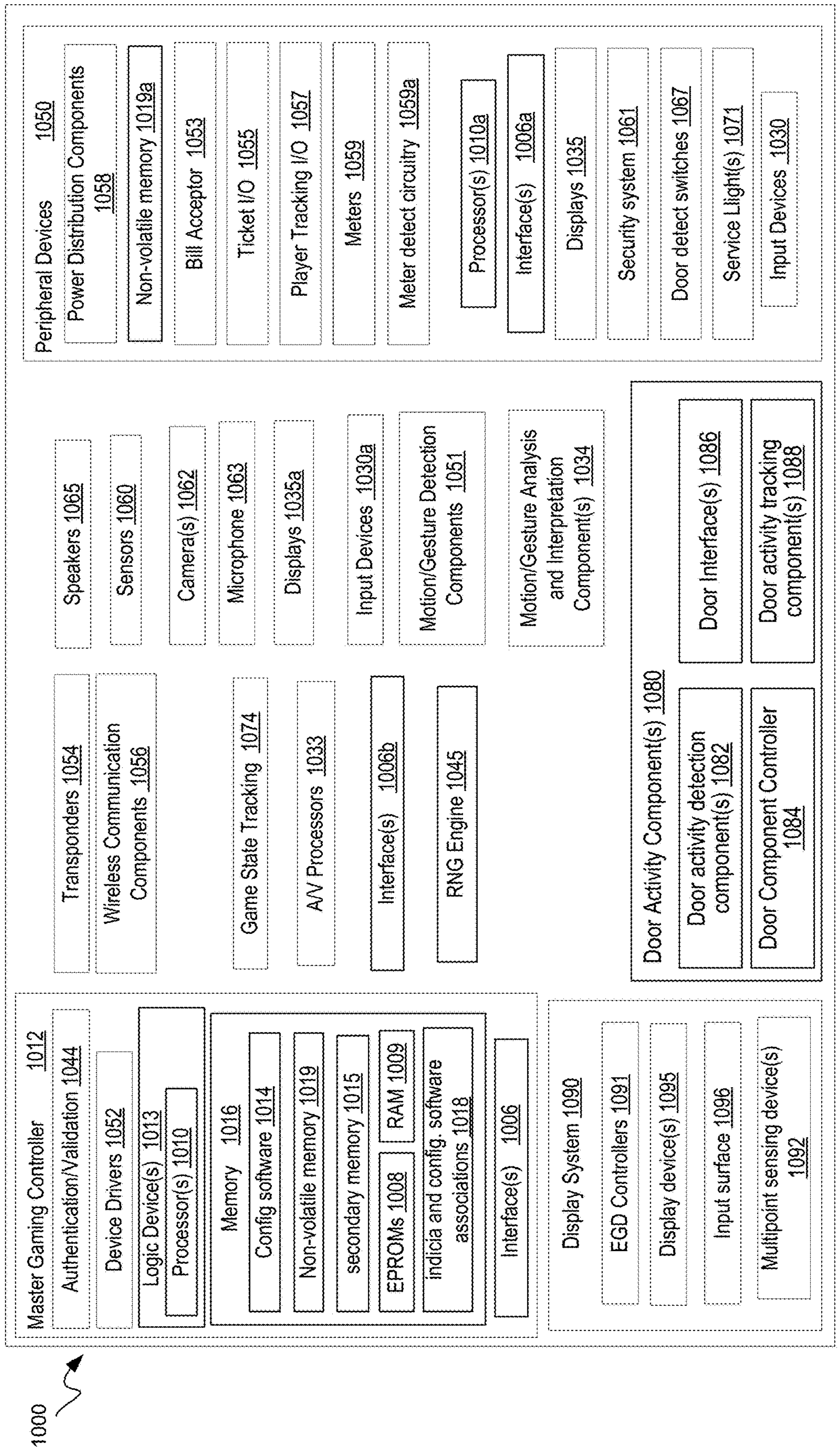
FIG. 10 provides a block diagram of an exemplary intelligent electronic gaming system according to one embodiment of the present disclosure.

Lastly, FIG. 10 provides a block diagram of an exemplary intelligent electronic gaming system according to one embodiment of the present disclosure. In some embodiments, gaming system 1000 may be implemented as a gaming server. In other embodiments, gaming system 1000 may be implemented as an EGM or electronic gaming terminal ("EGT"). Gaming system 1000 can be implemented on a single EGM, such as those shown in the foregoing examples, or can be implemented across multiple EGMs, EGTs, and potentially other devices and system components, such as a system server, as will be readily appreciated.

Gaming system 1000 can include at least one processor 1010, at least one interface 1006, and memory 1016. Additionally, gaming system 1000 can include at least one master gaming controller 1012, a multi-touch sensor and display system 1090, a plurality of peripheral device components 1050, and various other components, devices, systems such as, for example, one or more of the following (or combinations thereof):

- Transponders 1054;
- Wireless communication components 1056;
- Games state tracking components 1074;
- Audio/video processors 1033 which, for example, may include functionality for detecting, analyzing and/or managing various types of audio and/or video information relating to various activities at the gaming system;
- Various interfaces 1006*b* (e.g., for communicating with other devices, components, systems, etc.);
- RNG Engine 1045;
- Speakers 1065;
- Sensors 1060;
- One or more cameras 1062;
- One or more microphones 1063;
- Secondary display(s) 1035*a;*
- Input devices 1030*a;*
- Motion/gesture detection components 1051;
- Motion/gesture analysis and interpretation components 1034; and
- Accessibility components 1080, among other possible components.

In at least one embodiment, master gaming controller 1012 may include one or more of the following (or combinations thereof):

- Authentication/validation components 1044;
- Device drivers 1042;
- Logic devices 1013, which may include one or more processors 1010;
- Memory 1016, which may include one or more of the following (or combinations thereof): configuration software 1014, non-volatile memory 1019, secondary memory 1015, EPROMS 1008, RAM 1009, associations 1018 between indicia and configuration software; and
- Interfaces 1006, among other possible components.

In at least one embodiment, display system 1090 may include one or more of the following (or combinations thereof):

- Electronic Gaming Display ("EGD") controllers 1091;

Multipoint sensing device(s) (e.g., multi-touch surface sensors/components) 1092;

Display device(s) 1095; and

Input/touch surface 1096, among other possible components.

According to various embodiments, display device(s) 1095 may include one or more display screens utilizing various types of display technologies such as, for example, one or more of the following (or combinations thereof): LCDs (Liquid Crystal Display), Plasma, OLEDs (Organic Light Emitting Display), TOLED (Transparent Organic Light Emitting Display), Flexible (F)OLEDs, Active matrix (AM) OLED, Passive matrix (PM) OLED, Phosphorescent (PH) OLEDs, SEDs (surface-conduction electron-emitter display), EPD (ElectroPhoretic display), FEDs (Field Emission Displays) and/or other suitable display technology.

In at least one embodiment, Peripheral Devices 1050 may include one or more of the following (or combinations thereof):

Power distribution components 1058;

Non-volatile memory 1019*a* (and/or other types of memory);

Bill acceptor 1053;

Ticket I/O 1055;

Player tracking I/O 1057;

Meters 1059 (e.g., hard and/or soft meters);

Meter detect circuitry 1059*a;*

Processor(s) 1010*a;*

Interface(s) 1006*a;*

Display(s) 1035;

Independent security system 1061;

Door detect switches 1067;

Candles(s) 1071; and

Input devices 1030, among other possible components.

In one implementation, processor 1010 and master gaming controller 1012 can be included in a logic device 1013 enclosed in a logic device housing. The processor 1010 may include any conventional processor or logic device configured to execute software allowing various configuration and reconfiguration tasks such as, for example: a) communicating with a remote source via communication interface 1006, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 1035, input devices 1030; etc. For instance, the processor 1010 may send messages including game play information to the displays 1035 to inform players of cards dealt, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic card readers commercially available for reading a player-specific identification information. The player-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The gaming system may include other types of participant identification mechanisms which may use a fingerprint image, eye blood vessel image reader, or other suitable biological information to confirm identity of the player. Still further it is possible to provide such participant identification information by having the dealer manually code in the information in response to the player indicating his or her code name or real name. Such additional identification could also be used to confirm credit use of a smart card, transponder, and/or player's personal player input device (UID).

The gaming system 1000 also includes memory 1016 which may include, for example, volatile memory (e.g., RAM 1009), non-volatile memory 1019 (e.g., disk memory, FLASH memory, EPROMs, etc.), unalterable memory (e.g., EPROMs 1008), etc. The memory may be configured or designed to store, for example: 1) configuration software 1014 such as all the parameters and settings for a game playable on the gaming system; 2) associations 1018 between configuration indicia read from a device with one or more parameters and settings; 3) communication protocols allowing the processor 1010 to communicate with peripheral devices and I/O devices 1050; 5) a secondary memory storage device 1015 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming system to communicate with local and non-local devices using such protocols; etc. In one implementation, the master gaming controller 1012 communicates using a serial communication protocol. A few examples of serial communication protocols that may be used to communicate with the master gaming controller include but are not limited to USB, RS-232 and Netplex (a proprietary protocol developed by IGT, Reno, NV).

A plurality of device drivers 1042 may be stored in memory 1016. Examples of different types of device drivers may include device drivers for gaming system components, device drivers for gaming system components, etc. Typically, the device drivers 1042 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet 575, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 1016 by the processor 1010 to allow communication with the device. For instance, one type of card reader in gaming system 1000 may be replaced with a second type of card reader where device drivers for both card readers are stored in the memory 1016.

In some embodiments, the software units stored in the memory 1016 may be upgraded as needed. For instance, when the memory 1016 is a hard drive, new games, game options, various new parameters, new settings for existing parameters, new settings for new parameters, device drivers, and new communication protocols may be uploaded to the memory from the master gaming controller 1012 or from some other external device. As another example, when the memory 1016 includes a CD/DVD drive including a CD/DVD designed or configured to store game options, parameters, and settings, the software stored in the memory may be upgraded by replacing a first CD/DVD with a second CD/DVD. In yet another example, when the memory 1016 uses one or more flash memory 1019 or EPROM 1008 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 1000 may also include various authentication and/or validation components 1044 which may be used for authenticating/validating specified gaming system components such as, for example, hardware components, software components, firmware components, information stored in the gaming system memory 1016, and the like.

Sensors 1060 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; and the like.

In one implementation, at least a portion of the sensors 1060 and/or input devices 1030 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.).

Wireless communication components 1056 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication—Interface and Protocol (NFCIP-1)", published by ECMA International (www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 1058 may include, for example, components or devices which are operable for providing wireless power to other devices. For example, in one implementation, the power distribution components 1058 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 1051 may be configured or designed to detect player (e.g., player, dealer, and/or other persons) movements and/or gestures and/or other input data from the player. In some embodiments, each gaming system may have its own respective motion/gesture detection component(s). In other embodiments, motion/gesture detection component(s) 1051 may be implemented as a separate sub-system of the gaming system which is not associated with any one specific gaming system or device.

One or more cameras (e.g., 1062) may be used to monitor, stream and/or record image content and/or video content relating to persons or objects within each camera's view. For example, in at least one embodiment where the gaming system is implemented as an EGM or EGT, camera 1062 may be used to generate a live, real-time video feed of a player (or other person) who is currently interacting with the EGM or EGT. In some embodiments, camera 1062 may be used to verify a user's identity (e.g., by authenticating detected facial features), and/or may be used to monitor or track facial expressions and/or eye movements of a user who is interacting with the gaming system, such as to open an access door.

In various embodiments, the gaming system 1000 can also include various specialized access door activity components 1080. These can include one or more access door activity detection components 1082, an access door component controller 1084, one or more access door component interfaces 1086, and one or more access door activity tracking components 1088, among other possible components. These various access door activity components can interact with other components of gaming system 1000 as may be appropriate, such as by way of processors 1010, 1010*a*.

Access door component interfaces 1086 can include various components that casino personnel or another user can utilize to open or close an access door. This can include various manual inputs such as keyed locks or dedicated input panel buttons, as detailed above. Access door component interfaces 1086 can also include one or more motion sensors, RFID sensors, and/or other remotely operable buttons or inputs that may be used to facilitate door access from a remote location.

It should be understood that the devices, systems and methods described herein may be adapted and configured to function independently or may also interact with other systems or applications, such as for example, a casino management system or cash tracking system. As such, operator specific input/output door access data may be recorded and stored in connection with casino or resort management data, player information, or other data retrieved from a gaming machine, terminal or other pertinent location. It should also be readily apparent that additional computerized or manual systems may also be employed in accordance with the disclosure in order to achieve its full implementation as a system, apparatus or method.

The present application herein incorporates by reference, in its entirety and for all purposes, U.S. patent application Ser. No. 15/867,298, titled "GAMING SYSTEM HAVING CHANCE UPGRADING AND/OR OTHER TRANSFORM OF PLURAL SYMBOLS ALONG TARGET LINE" by Hemovich et al., filed on 10 Jan. 2018.

The various aspects, embodiments, implementations or features of the described embodiments can be used separately or in any combination. Various aspects of the described embodiments can be implemented by software, hardware or a combination of hardware and software. Computer readable medium can be any data storage device that can store data which can thereafter be read by a computer system. Examples of computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A gaming machine, comprising:

a game determination component that facilitates the result of a wager-based game played at the gaming machine;

one or more input devices coupled to the game determination component that accept input from a player regarding the play of the wager-based game;

one or more output devices coupled to the game determination component that present output to the player regarding the result of the wager-based game;

a gaming machine cabinet configured to house the game determination component, the one or more input devices, and the one or more output devices;

a movable cash door located about an external region of the gaming machine cabinet, the cash door facilitating access to a cash region located at an interior of the gaming machine;

wherein the cash door is movably attached to the gaming machine via a pivot hinge opening arrangement, the pivot hinge opening arrangement being moveably attached to the gaming machine in a manner which enables movement of the cash door in a swivel motion from a closed position to an open position; and wherein the swivel motion of the cash door is about a virtual axis having a center of rotation for which no physical axial component passes therethrough.

2. The gaming machine of claim 1, wherein the pivot hinge opening arrangement includes:

a first pivot hinge track having a first arc slot located along a first side of the cash door;

a second pivot hinge track having a second arc slot located along a second side of the cash door opposite the first side; and wherein the first and second pivot hinge tracks are attached to the cash door in a manner which enables movement of the first and second pivot hinge tracks in the swivel motion about the virtual axis.

3. The gaming machine of claim 2, wherein the pivot hinge opening arrangement further includes:

a first leaf hinge located at the gaming machine housing and configured to mate with the first pivot hinge track, wherein the first leaf hinge includes a first pivot hinge insert configured to extend into the first arc slot; and a second leaf hinge located at the gaming machine housing and configured to mate with the second pivot hinge track, wherein the second leaf hinge includes a second pivot hinge insert configured to extend into the second arc slot.

4. The gaming machine of claim 3, wherein the pivot hinge opening arrangement further includes:

a first hinge pin attached to the first pivot hinge insert;

a second hinge pin attached to the second pivot hinge insert; and wherein the first and second hinge pins are attached in a manner which facilitates stability of the first and second pivot hinge tracks and first and second pivot hinge inserts as the cash door swivels between the closed and open positions.

5. The gaming machine of claim 4 wherein:

each of the first and second fixed leaf hinges, the first and second pivot hinge inserts, and first and second hinge pins do not move independently while the cash door swivels between the closed and open positions; and wherein the first and second pivot hinge tracks swivel or move relative to the pivot hinge inserts while the cash door swivels between the closed and open positions.

6. The gaming machine of claim 1 wherein the pivot hinge opening arrangement is devoid of a hinge pin about which the cash door pivots about the virtual axis.

7. The gaming machine of claim 1:

wherein cash door remains coupled to the gaming machine when the cash door is in the open position; and wherein cash door remains coupled to the gaming machine when the cash door is in the closed position.

8. The gaming machine of claim 1, wherein the pivot hinge opening arrangement further includes first and second pivot inserts, the first and second pivot inserts being attached to the gaming machine in a manner which enables the first and second pivot hinge inserts to remain stationary and inside the first and second arc slots as the cash door moves in the swivel motion.

9. The gaming machine of claim 1, further including:

an indicator switch coupled to an interior region of the gaming machine, wherein the indicator switch provides a signal regarding a closed position of the cash door;

an indicator switch activator configured to actuate the indicator switch when the cash door is in the closed position; and a physical feature located on the virtual pivot hinge opening arrangement, wherein the physical feature moves the indicator switch activator when the cash door is in the closed position.

10. A gaming machine, comprising:

a game determination component that facilitates the result of a wager-based game played at the gaming machine;

one or more input devices coupled to the game determination component that accept input from a player regarding the play of the wager-based game;

one or more output devices coupled to the game determination component that present output to the player regarding the result of the wager-based game;

a gaming machine cabinet configured to house the game determination component, the one or more input devices, and the one or more output devices;

a movable cash door located about an external region of the gaming machine cabinet, the cash door facilitating access to a cash region located at an interior of the gaming machine;

wherein the cash door is movably attached to the gaming machine via a pivot hinge opening means for enabling movement of the cash door in a swivel motion from a closed position to an open position; and wherein the swivel motion of the cash door is about a virtual axis having a center of rotation for which no physical axial component passes therethrough.

11. The gaming machine of claim 10, wherein the pivot hinge opening means includes:

a first pivot hinge track means having a first arc slot located along a first side of the cash door;

a second pivot hinge track means having a second arc slot located along a second side of the cash door opposite the first side; and wherein the first and second pivot hinge track means are attached to the cash door in a manner which enables movement of the first and second pivot hinge track means in the swivel motion about the virtual axis.

12. The gaming machine of claim 11, wherein the pivot hinge opening means further includes:

a first leaf hinge means located at the gaming machine housing and configured to mate with the first pivot hinge track means, wherein the first leaf hinge means includes a first pivot hinge insert means configured to extend into the first arc slot; and a second leaf hinge means located at the gaming machine housing and configured to mate with the second pivot hinge track means, wherein the second leaf hinge means includes a second pivot hinge insert means configured to extend into the second arc slot.

13. The gaming machine of claim 12, wherein the pivot hinge opening means further includes:

a first hinge pin means attached to the first pivot hinge insert means;

a second hinge pin means attached to the second pivot hinge insert means; and wherein the first and second hinge pin means are attached in a manner which facilitates stability of the first and second pivot hinge track means and first and second pivot hinge insert means as the cash door swivels between the closed and open positions.

14. The gaming machine of claim 13 wherein:

each of the first and second fixed leaf hinge means, the first and second pivot hinge insert means, and first and second hinge pin means do not move independently while the cash door swivels between the closed and open positions; and wherein the first and second pivot hinge track means swivel or move relative to the pivot hinge insert means while the cash door swivels between the closed and open positions.

15. The gaming machine of claim 10 wherein the pivot hinge opening means is devoid of a hinge pin about which the cash door pivots about the virtual axis.

16. The gaming machine of claim 10:

wherein cash door remains coupled to the gaming machine when the cash door is in the open position; and wherein cash door remains coupled to the gaming machine when the cash door is in the closed position.

17. The gaming machine of claim 10, wherein the pivot hinge opening means further includes first and second pivot insert means, the first and second pivot insert means being attached to the gaming machine in a manner which enables the first and second pivot hinge insert means to remain stationary and inside the first and second arc slots as the cash door moves in the swivel motion.

18. The gaming machine of claim 10, further including:

an indicator switch means coupled to an interior region of the gaming machine, wherein the indicator switch means provides a signal regarding a closed position of the cash door;

an indicator switch activator means configured to actuate the indicator switch means when the cash door is in the closed position; and physical feature means located on the virtual pivot hinge opening means for moving the indicator switch activator when the cash door is in the closed position.

* * * * *